United States Patent
Agmon et al.

(10) Patent No.: US 8,003,915 B2
(45) Date of Patent: Aug. 23, 2011

(54) SYSTEM AND METHODS FOR PRODUCING TINTED AND NON-TINTED MATERIALS WITH NON-DISCERNABLE LASER INSCRIPTIONS

(75) Inventors: Pinchas Agmon, Givat Shmuel (IL); Dan Assaf, Yesod Hamaala (IL)

(73) Assignee: Laserop Ltd., Petach Tikva (IL)

( * ) Notice: Subject to any disclaimer, the term of this patent is extended or adjusted under 35 U.S.C. 154(b) by 943 days.

(21) Appl. No.: 11/792,529

(22) PCT Filed: Dec. 8, 2005

(86) PCT No.: PCT/IL2005/001323
§ 371 (c)(1),
(2), (4) Date: Jun. 7, 2007

(87) PCT Pub. No.: WO2006/061836
PCT Pub. Date: Jun. 15, 2006

(65) Prior Publication Data
US 2007/0262061 A1    Nov. 15, 2007

Related U.S. Application Data

(60) Provisional application No. 60/634,695, filed on Dec. 8, 2004.

(51) Int. Cl.
*B23K 26/00* (2006.01)
*B23K 26/40* (2006.01)
*B23K 26/42* (2006.01)
*G02C 7/02* (2006.01)
*G02C 7/04* (2006.01)

(52) U.S. Cl. ............... 219/121.69; 264/400; 264/482

(58) Field of Classification Search .......... 427/554, 427/555; 219/121.68, 121.69, 121.6, 121.85; 264/400, 482; 65/29.18, 33.2, 37, 56, 61, 65/392
See application file for complete search history.

(56) References Cited

U.S. PATENT DOCUMENTS

| | | | |
|---|---|---|---|
| 4,512,461 A | | 4/1985 | Wichterle |
| 5,448,418 A | * | 9/1995 | Hotate et al. .............. 359/883 |
| 5,580,498 A | | 12/1996 | Sugiyama et al. |
| 5,866,262 A | * | 2/1999 | Galic et al. ................ 428/447 |
| 6,024,447 A | | 2/2000 | Portney |
| 6,024,448 A | * | 2/2000 | Wu et al. .................. 351/160 R |
| 6,743,486 B1 | * | 6/2004 | Miyazawa .................. 451/43 |

(Continued)

FOREIGN PATENT DOCUMENTS

| | | |
|---|---|---|
| JP | 2006-150364 A | 6/2006 |
| WO | WO-00/59679 A1 * | 10/2000 |
| WO | WO-02/089041 * | 7/2002 |

*Primary Examiner* — Geoffrey S Evans
(74) *Attorney, Agent, or Firm* — The Nath Law Group; Susanne M. Hopkins; William L. Klima

(57) ABSTRACT

A system and method for inscribing marks, that will remain non-discernable after tinting, on materials in general, and on plastic ophthalmic lenses in particular. The system uses a laser, which typically performs a heating-type inscription process, such as by use of a $CO_2$ laser. In accordance with a preferred embodiment of the present invention, there is provided an apparatus for producing laser inscription on materials, including laser inscription apparatus for inscribing inscriptions on a surface of the materials, and apparatus for treating a zone of the surface that was affected by the laser inscription beam, to prevent it from absorbing excessive dye relative to other zones, wherein the inscriptions remain non-discernable after applying the dye.

14 Claims, 1 Drawing Sheet

U.S. PATENT DOCUMENTS

| | | |
|---|---|---|
| 2002/0003605 A1 | 1/2002 | Rogers et al. |
| 2003/0016458 A1* | 1/2003 | Richard ........................ 359/883 |
| 2003/0029849 A1* | 2/2003 | Trinks et al. ............. 219/121.69 |
| 2003/0129925 A1* | 7/2003 | Toyoshima et al. ............... 451/5 |
| 2003/0157762 A1* | 8/2003 | Peterson ........................ 438/200 |
| 2004/0126703 A1* | 7/2004 | Dykhne et al. ................ 430/296 |
| 2005/0024583 A1 | 2/2005 | Neuberger |

* cited by examiner

SYSTEM AND METHODS FOR PRODUCING TINTED AND NON-TINTED MATERIALS WITH NON-DISCERNABLE LASER INSCRIPTIONS

CROSS-REFERENCE

This is a National Phase Application filed under 35 U.S.C. 371 of International Application No. PCT/IL2005/001323, filed Dec. 8, 2005, claiming the benefit under 35 USC 119(e) of U.S. Provisional Application No. 60/634,695, filed Dec. 8, 2004, the entire contents of each of which is hereby incorporated herein by reference in its entirety.

FIELD OF THE INVENTION

The present invention relates to laser inscribing of non-discernable marks on materials in general, and in particular on plastic ophthalmic lenses, and specifically on plastic Progressive Addition Lenses (PAL). In particular, the invention relates to methods for preserving the marks as non-discernable even if the materials are treated in a tinting process.

BACKGROUND OF THE INVENTION

Lasers are used to inscribe discernable and non-discernable marks on materials, such as plastics. This technology is currently used, for example, to inscribe ophthalmic lenses in general, and Progressive Addition Lenses, in particular. A Progressive Addition Lens (PAL) is an eyeglass lens that incorporates corrections for distance vision through midrange, to near vision (usually in lower part of lens), with smooth transitions and no bifocal demarcation line. Progressive Addition Lenses are currently made of glass or plastic materials. Often the glass lenses are called "mineral lenses" while the plastic lenses are called "organic lenses".

Progressive Addition Lenses (PAL) require inscriptions at several locations. The inscription may include reference marks for later edging of the lens, for power verification of the "add power" of the lens, for a logo, for a brand-name, for anti-counterfeiting, and for other technological reasons and applications. Typically, a lens inscription includes small marks, typically 1-2 mm in height, characters and logos that are clear, aesthetic and non-discernable.

One method of producing a plastic Progressive Addition Lens is by machining one or both of its surfaces to form an aspheric shape or shapes. When only one surface is aspherically shaped, the other surface may be spherical. This method is referred to as "Free-Form".

The marks, although they are within the active area of the lens, must not hinder the sight of the eyeglasses wearer nor be seen by a casual observer. On the other hand, the marks must be readable, for instance, by technical and marketing personnel, by a customer who seeks the manufacturer's brand name, or by an imaging vision machine. The non-discernable mark can be observed under certain light conditions such as against the transition between light and shadow. This type of inscription is referred herein as a non-discernable inscription, also known as "semi-visible", "invisible", "hidden mark", or similar names.

Laser inscription is a conventional technology for non-discernable inscription on Free-Form plastic Progressive Addition Lenses. The most commonly used lasers for this purpose (today) are the Excimer laser and the solid-state UV laser. However, these systems are very expensive.

A $CO_2$ laser, which is a typical state-of-the art laser, is relatively inexpensive, very reliable and requires little and infrequent maintenance. $CO_2$ lasers are used for the inscription of non-discernable marks. For instance LaserOp Ltd 6 Halapid St. Petah Tikva, 49170, Israel, manufactures Lens-Mark™ II, which is a $CO_2$ laser-based system for inscription of non-discernable marks, and so do others. The LensMark™ II system is suggested herein as an example, but other suitable $CO_2$ laser based systems for inscription of materials may be used.

Compared to the laser systems which are based on Excimer and other UV lasers systems, the LensMark™ II is much more reliable and affordable in price. The LensMark™ II satisfies many requirements for the inscription of non-discernable marks. It generates acceptable non-discernable inscriptions on all plastic lenses tested so far, such as polycarbonate, CR39, Index 1.6, Index 1.67, Index 1.7, Trivex and others, as well as on selected glass lenses. The inscription is acceptably non-discernable using LensMark™ II when it inscribes the material after tinting or where tinting is not applied to the material.

However, when the tinting is performed on a plastic lens which has been previously inscribed by a $CO_2$ laser, the marks are unacceptably visible. For example, in a typical inscription process of the LensMark™ II system alone, it is found that tinting above 12% absorption makes the inscriptions unacceptably visible.

This problem is known to those who are skilled in the art. This problem is one of the reasons that many lens producers avoid using a $CO_2$ laser for the inscription of non-discernable marks on plastic lenses.

The inscription process of the plastic material by the $CO_2$ laser beam, unlike the inscription process performed by Excimer or solid-state UV lasers, is a thermal or a heating-type inscription process.

The area, which is affected by the heating of the material as a result of the absorption of the laser beam, is the "Heat Affected Zone" (HAZ). This zone may include areas of material that have been removed by evaporation, areas of material that have been melted and re-solidified and areas of material that have gone through other morphological changes due to the heat.

Typically, the evaporation creates a hole, whose walls and bottom and surroundings are covered by the melted and re-solidified material. The HAZ can be described by a form of a hole with a diameter proportional to the beam's spot size, surrounded by an elevated ring. However, depending on the material and the laser beam parameters, the material might not reach the evaporation temperature anywhere within the beam cross-section and a hole is not created. The result will be a disc-like shape of elevated material. Similarly, when the beam scans the material continuously, the result may be a groove with elevated banks or a continuous line of elevated material.

The material at the HAZ may become porous, may have lower density relative to material in unaffected zones, and may occupy a larger volume. It is believed that the lower density of the material in the HAZ increases the density of the dye physically absorbed there, thus increasing the optical absorption by the dye, and consequently increasing its contrast and visibility.

Therefore, it would be desirable to provide a system and method for inscribing marks that remain non-discernable after tinting, on materials in general, and on plastic ophthalmic lenses in particular, using a $CO_2$ laser.

SUMMARY OF THE INVENTION

Accordingly, it is an object of the present invention to overcome the limitations of prior art methods of $CO_2$ laser inscription, and to provide an improved system and methods for inscribing marks that will remain non-discernable after tinting, on materials in general, and on plastic ophthalmic lenses in particular, using a $CO_2$ laser or other. The inventive system and methods should not interfere when tinting is not applied after inscription.

In accordance with a preferred embodiment of the present invention, there is provided a system for producing laser inscription on materials, said system comprising:

laser inscription means for inscribing inscriptions on a surface of the materials, and
   means for treating a zone of the surface that was affected by the laser inscription means, to prevent it from absorbing excessive dye relative to other zones,
   wherein the inscriptions remain non-discernable after applying a dye.

In a preferred method according to the invention, there is provided a method for producing laser inscription on materials, said method comprising:

inscribing inscriptions on a surface of the materials, and
   treating a zone of the surface that was affected by the laser during inscribing, to prevent it from absorbing excessive dye relative to other zones,
   wherein the inscriptions remain non-discernable after applying a dye.

In a preferred embodiment, the system uses a laser apparatus, which typically performs a heating-type inscription process, such as by use of a $CO_2$ laser. The system also includes apparatus for treating a zone of the surface that was affected by the laser inscription beam, to prevent it from absorbing excessive dye relative to other zones, so that the inscriptions remain non-discernable after applying the dye. The invention provides several alternative methods for treating the affected zone.

Other features and advantages of the invention will become apparent from the following drawings and descriptions.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE PREFERRED EMBODIMENTS

Figure 1:
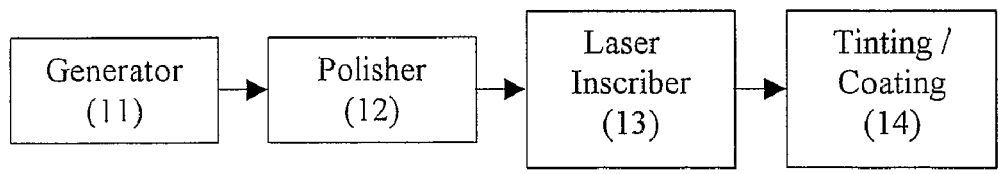
FIG. 1 illustrates a prior art process for producing a tinted and non-tinted material with a non-discernable laser marking.

Referring now to FIG. 1, there is illustrated a typical "Free-Form" process of the prior art. A lens is machined from a blank of an appropriate material. Initially, the surface is machined to closely follow the designed curvature. This stage is referred to as "generation" and the machine that performs it is called a "Generator" (11). Next, the surface is polished to its final required shape and smoothness. This stage is referred to as "polishing" and the machine that performs it is called a "Polisher" (12). Next, the lens is inscribed by the Laser Inscriber (13). Mechanical engraving is possible too, but this technique is not discussed in this disclosure. Although the above stages are performed by different machines, they are a joint process performed by one system, due to the use of a single mounting block, which accompanies the lens from one machine to another to preserve the original position and orientation. The inscribed lens can now be manufactured in further stages (14), e.g. tinting, coating, edging.

This procedure can be represented in a general fashion as:
Generation->Polishing->Laser Inscription->Next Steps (tinting, coating etc.)

Typically, in applying this prior art process with a $CO_2$ laser, the inscriptions of the third stage become unacceptably visible after tinting of the fourth stage.

The present invention provides several alternative methods to overcome this problem. These methods maintain the inscribed marks as non-discernable even after tinting. Each method is recommended for a different case.

Pre-Polish Method

Figure 2:
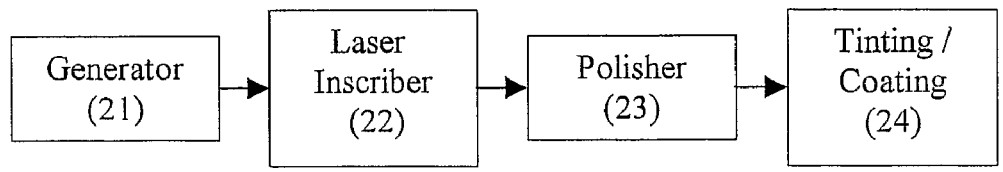
FIG. 2 illustrates the inventive process for producing a tinted and non-tinted material with a non-discernable laser marking.

Referring to FIG. 2, an example of the inventive method is illustrated. The laser first inscribes the material (22) and only then the Polisher polishes it (23). The Polisher treats the inscribed regions and the Heat Affected Zones (HAZ) so that at the tinting stage (24), they are prevented from receiving dye at a density significantly higher than in other regions.

The inventive method is easily applied to the Free-Form process (prior art FIG. 1 of PAL) by changing the processing order. In this method, the Generator (21) generates the lens, then the Laser Inscriber (22) inscribes the lens, and only then is the lens polished by the Polisher (23), so the new procedure can be represented in a general fashion as:
Generation->Laser Inscription->Polishing->Next Steps (tinting, coating etc.)

This method is recommended for cases such as the Free-Form process, and is preferred for manufacturers, as there is no additional stage to the process. This process is acceptable also when tint is not applied.

In cases where it is difficult to apply the polishing procedure to precisely form the desired surface, the following methods are presented.

Non-Tintable Pre-Coating Method

Figure 3:
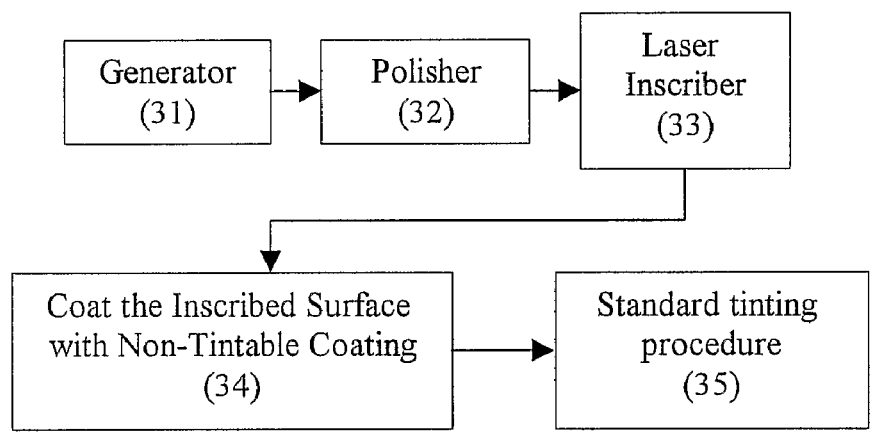
FIG. 3 illustrates an example of an alternative method for producing a tinted material with a non-discernable laser marking, by coating only the inscribed surface by a non-tintable coating.

Referring now to FIG. 3, an example of the inventive method is illustrated. Non-tintable coating (34) is a standard coating, preferably transparent, to which dye does not adhere, and substantially prevents the lens from absorbing the dye. Preceding the standard tinting procedure (35) an additional coating stage is performed. In this additional stage, only the side of the lens that was inscribed is covered with a non-tintable coating (34), for instance, by setting the lens horizontally with the inscribed surface facing up, applying the non-tintable coating on the inscribed surface and spinning the lens.

This non-tintable coating substantially prevents the coated surface from absorbing the tint. Then when the lens is dipped into a dye, as in a standard tinting process (35), only the surface that has not been pre-coated, will absorb the dye.

The drawback of this technique is its added stage, which places a burden on manufacturers. The advantage of this technique is that it is not affected by previous stages of the process (31, 32, 33) or by their order, or by the laser type that produced the inscription, or by the form of the inscription. Therefore this technique is recommended when the lens was formed by an external forming machine or has already been removed from the mounting block of the local forming machine, whereas polishing cannot be performed anymore precisely at the desired surface by the Pre-Polish method.

However, this technique cannot be applied in cases where there is no acceptable technique for applying the non-tintable coating to the inscribed surface only, or when inscriptions are applied to both sides of the lens. In these cases the following method is presented.

Tintable Pre-Coating Method

Figure 4:
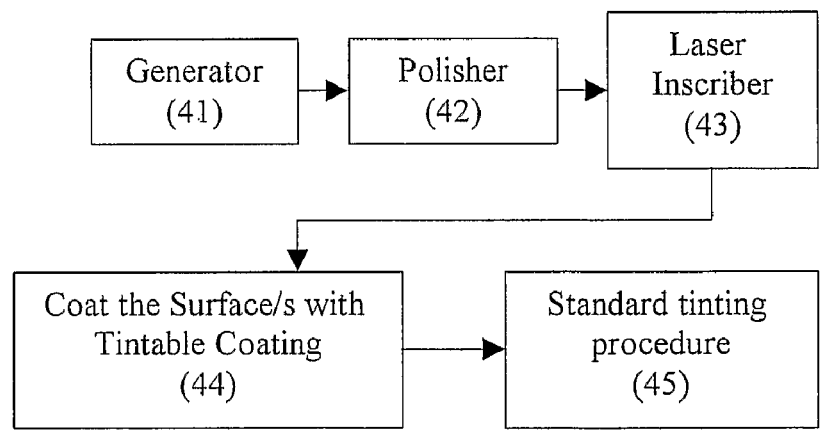
FIG. 4 illustrates an example of another alternative method for producing a tinted material with a non-discernable laser marking, by coating only the inscribed surface or both surfaces by a tintable coating.

Referring now to FIG. 4, another example of the inventive method is illustrated. Tintable coating (44) is a standard coating, preferably transparent, to which the dye adheres, but substantially prevents the lens from absorbing the dye. Preceding the standard tinting procedure (45), the inscribed surface or even both sides of the lens are covered with tintable coating (44), for instance by dipping the lens.

This tintable coating (44) covers the Heat Affected Zone and typically fills spaces where the material is porous, and typically prevents the dye from being excessively absorbed there. Then when the lens is dipped into the dye, as in a standard tinting process (45), the inscribed regions will not receive an amount of dye much above the amount of other regions. A close to uniform layer of dye will be formed even above the inscription area.

This technique possesses the above-mentioned drawback of having an added stage (44), which is a burden on manufacturers. However, the advantage of this technique is that it is not affected by previous stages of the process (41, 42, 43) or by their order, or by the laser type that produced the inscription, or by the form of the inscription. Therefore this technique is recommended when both surfaces of the lens are inscribed, whereas the Non-Tintable Pre-Coating method is not available, and the lens was formed by an external forming machine or has already been removed from the mounting block of the local forming machine, whereas polishing cannot be performed anymore precisely at the desired surface by the Pre-Polish method.

The description of the specific embodiments is not limited to the above examples. For instance, the $CO_2$ laser mentioned is only an example, and other lasers can be applied.

While the present invention has been described with respect to certain embodiments and methods, it is to be understood that the description is not meant as a limitation, since further modifications may now suggest themselves to those skilled in the art, and it is intended to cover such modifications as fall within the scope of the following claims.

The invention claimed is:

1. A method for producing laser inscription on a material, comprising:
   inscribing a non-discernable inscription by a laser on a surface of the material;
   treating at least a zone of the surface that was affected by the laser inscription, to prevent the zone from absorbing excessive dye relative to other zones of the surface; and
   applying a dye to the surface of the material,
   wherein the non-discernable inscription remains non-discernable after applying the dye.

2. The method of claim 1, wherein said inscribing comprises performing a heating inscription process.

3. The method of claim 1, wherein said treating comprises polishing at least the affected zone of the surface to a desired smoothness.

4. The method of claim 1, wherein said treating comprises applying a layer of non-tintable coating to said the surface, while not applying the non-tintable coating to another surface of the material,
   wherein the dye substantially does not adhere to the non-tintable coating, and the non-tintable coating layer substantially prevents the dye from being absorbed through the surface of the material in the affected zone.

5. The method of claim 1, wherein said treating comprises applying a layer of tintable coating to at least the affected zone of the surface, and wherein the dye substantially adheres to the tintable coating, and the tintable coating layer substantially prevents the dye from being absorbed through the surface of the material in at least the affected zone.

6. A method for producing laser inscription on a material, comprising:
   inscribing a non-discernable inscription by a laser on a surface of the material;
   treating the surface to prevent the inscription from becoming discernable when a dye is applied thereon; and
   applying the dye to the surfaces of the material.

7. The method of claim 6, wherein said inscribing comprises performing a heating inscription process.

8. The method of claim 6, wherein said treating comprises polishing said surface at least at a zone of the inscription to a desired smoothness.

9. The method of claim 6, wherein said treating comprises applying a layer of non-tintable coating to the surface, while not applying the non-tintable coating to another surface of said materials, wherein the non-tintable coating is such that the dye substantially does not adhere to the non-tintable coating, and
   the non-tintable coating layer substantially prevents the dye from being absorbed through the surface of the material at least in a zone of the inscription.

10. The method of claim 6, wherein said treating comprises applying a layer of tintable coating to the surface at least in a zone of the inscription, and wherein the dye substantially adheres to the tintable coating, and the tintable coating substantially prevents the dye from being absorbed through the surface of the material at least in the zone of the inscription.

11. A method for producing laser inscription on a material before this material is tinted with a dye, said method comprising:
   inscribing a non-discernable inscription by a laser on a surface of the material; and
   treating at least a zone of the surface that was affected by the laser by applying to the surface a layer of treating coating that substantially prevents the dye from being absorbed through the surface of the material,
   wherein the non-discernable inscription remains non-discernable after applying said dye.

12. The method of claim 11, wherein said treating coating is a non-tintable coating and wherein the dye substantially does not adhere to the non-tintable coating.

13. The method of claim 11, wherein the treating coating is a tintable coating, and wherein the dye substantially adheres to the tintable coating.

14. The method of claim 11, wherein the treating coating is transparent.

* * * * *